(12) United States Patent
Kitamura et al.

(10) Patent No.: US 7,072,986 B2
(45) Date of Patent: Jul. 4, 2006

(54) SYSTEM AND METHOD FOR DISPLAYING STORAGE SYSTEM TOPOLOGY

(75) Inventors: Manabu Kitamura, Yokohama (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 661 days.

(21) Appl. No.: 10/072,573

(22) Filed: Feb. 8, 2002

(65) Prior Publication Data
US 2003/0088683 A1 May 8, 2003

(30) Foreign Application Priority Data
Nov. 7, 2001 (JP) .............................. 2001-341361

(51) Int. Cl.
*G06F 15/16* (2006.01)
(52) U.S. Cl. ...................... 709/249; 709/230; 709/250; 715/734; 715/735; 715/736; 707/10; 711/1; 711/2; 711/3; 711/4; 711/5; 711/100; 711/111; 711/148; 711/170
(58) Field of Classification Search ................ 709/230, 709/250; 715/734–736; 707/10; 711/1–5, 711/100, 111, 148, 170
See application file for complete search history.

(56) References Cited

U.S. PATENT DOCUMENTS

| 5,793,974 A | | 8/1998 | Messinger |
| 6,225,999 B1 * | | 5/2001 | Jain et al. .................... 715/734 |
| 6,446,141 B1 | | 9/2002 | Nolan et al. |
| 6,538,669 B1 * | | 3/2003 | Lagueux et al. ............. 715/764 |
| 6,606,690 B1 * | | 8/2003 | Padovano .................... 709/220 |
| 6,636,239 B1 * | | 10/2003 | Arquie et al. ................ 714/736 |
| 6,779,063 B1 * | | 8/2004 | Yamamoto .................... 710/74 |
| 6,839,747 B1 * | | 1/2005 | Blumenau et al. ........... 709/223 |
| 6,868,417 B1 * | | 3/2005 | Kazar et al. ................... 707/10 |
| 2003/0167327 A1 * | | 9/2003 | Baldwin et al. ............. 709/225 |

FOREIGN PATENT DOCUMENTS

| JP | 07-079246 A | 3/1995 |
| JP | 2001-249908 A | 9/2001 |

OTHER PUBLICATIONS

Arai "The latest trend of IP storage networking," Computertopia 36:74-77, Japan (Aug. 2001).

* cited by examiner

*Primary Examiner*—John Follansbee
*Assistant Examiner*—Ashok B. Patel
(74) *Attorney, Agent, or Firm*—Townsend and Townsend and Crew LLP

(57) ABSTRACT

A management display method according to each type of interfaces and devices is provided in an environment where host computers are interconnected with storage apparatuses through plural types of interfaces. The management host computer includes a display apparatus and allows a user to select a physical view for displaying a physical topology between each host and storage subsystems or a logical view for displaying a connecting relation between the devices of the storage subsystem and each host computer. The management host computer operates to collect the information of the Fibre channel interface and the Ethernet interface and the information about an access limitation of each device, included in each host computer and storage subsystem and then to display the connecting relation according to the display method (view) selected by the user, based on the collected information.

3 Claims, 18 Drawing Sheets

FIG. 3

| APPRATUS ID | DEVICE No. | WWN | LUN | SIZE | CONNECTION PERMITTED WWN |
|---|---|---|---|---|---|
| 3 | 1 | 2200002037000f96 | 0 | 20GB | NULL |
| 4 | 0 | 1200002037000001 | 0 | 15GB | 1400002037000e00 |
| 5 | 0 | 2200002037000e81 | 0 | 40GB | 2100002037000000, 2200002037000ff2 |
| | | | | | |
| | | | | | |

FIG. 4

| APPARATUS ID 61 | DEVICE No. 62 | MAC Addr. 73 | IP Addr. 74 | EXPORT DIRECTORY 75 | LUN 76 | SIZE 77 | CONNECTION PERMITTED HOST 78 |
|---|---|---|---|---|---|---|---|
| 1 | 0 | 00:90:00:00:00:00 | 192.168.5.1 | NULL | 0 | 20GB | hostA |
| 2 | 0 | 00:90:00:00:00:00 | 192.168.5.2 | /usr1 | NULL | 6GB | hostA |
| 3 | 0 | 00:90:00:00:00:00 | 192.168.5.3 | /usr2 | NULL | 40GB | hostA,hostB |

| APPARATUS ID | DEVICE No. | SIZE |
|---|---|---|
| 3 | 2 | 40GB |
|  |  |  |

FIG. 6

| HOST NAME | WWN | MAC Addr. | IP Addr. |
|---|---|---|---|
| hostA | 2100002037000000 | 00:6f:00:00:00:00 | 192.1685.128 |
| hostB | NULL | 00:90:00:00:20:00 | 192.1685.129 |
| hostC | 1400002037000e00 | 00:90:00:00:00:00 | 192.1685.130 |
| hostD | 2200002037000ff2 | 00:90:01:00:00:00 | 192.1685.131 |
| — | — | — | — |
|  |  |  |  |
|  |  |  |  |

FIG. 7

| 81 | 92 | 93 | 94 | 95 |
|---|---|---|---|---|
| HOST NAME | USING APPARATUS | DEVICE No. | EXPORT DIRECTORY | CONNECTION PERMITTED HOST |
| hostC | 4 | 0 | /home1 | hostD |
| — | — | — | — | — |

| ZONE (111) | WWN (112) |
|---|---|
| 1 | 2200002037000f96, 2100002037000000 |
| 2 | 1400002037000e00, 2200002037000ff2. 1200002037000001, 2200002037000e81 |
| — | — |

SYSTEM AND METHOD FOR DISPLAYING STORAGE SYSTEM TOPOLOGY

BACKGROUND OF THE INVENTION

The present invention relates to a method of managing a storage system included in an information processing system, and more particularly to the method of managing a system in a computer system having a plurality of computers interconnected with a plurality of storage apparatuses through physical mediums such as Fibre Channel and Ethernet.

In general, a computer system often used in an office, an enterprise or the like includes a plurality of host computers (each of which is referred simply to as a host) interconnected through a network like Ethernet. This network is called LAN (Local Area Network). The LAN may be connected with another network so that the LAN be built in a large-scale system, ranging from a regional system to the worldwide system as the largest area system.

With recent advent of the Fibre Channel that realizes a faster data transfer, the concept of a SAN (Storage Area Network) appears which includes a plurality of hosts connected with a plurality of storages through one physical communication line. If the SAN includes a plurality of hosts and storages like disk apparatuses interconnected therewith, all the hosts connected in the SAN may make access to one disk apparatus. Conventionally, one host can be connected with only one storage, while the SAN allows a plurality of hosts to make access to any storage so that the hosts can easily share any storage apparatus. This, however, leads to the complicated connections between the hosts and the storages.

In a case that a simply configured network includes a small number of hosts and storages, each user of the connected apparatuses can easily manage the apparatuses, so that a significant problem may hardly take place. That is, if a user replaces an existing apparatus with a new one and installs software into the apparatus, a problem may hardly take place. Even if a certain problem takes place, the user may relatively easily diagnose what kind of problem took place, and the problem does not have an adverse effect on so wide a range of the network.

On the other hand, in a large-scaled complicated network or a large-scaled LAN having LANs interconnected therewith, the adverse effect given by a possible problem ripples through the network and the search, and the diagnosis and the countermeasure of the problem is made more difficult. Such a large-scaled network needs a management by a skilled person. A network manager (referred simply to as a user) enables to obtain management data on the network and find out a problem on the management data or change the management data and thereby change settings of the system through the use of network management software.

In general, the network management software allows a user to more clearly view a logical connecting relation of the hosts and handle the hosts through a graphical user interface (GUI). For example, the U.S. Pat. No. 5,793,974 discloses the display system for managing the network and the method therefor. This publication proposes the method of dividing the hosts into groups (domains) and displaying each group (domain).

A new type of management software has been proposed which manages the storage apparatus in the SAN in the same manner as the host. This type of management software allows a plurality of hosts and storages interconnected with the Fabric Switch or the like to be graphically displayed. However, the function to be handled by this management software is merely to monitor each storage apparatus. For the storage apparatus, the management of a volume is more required rather than the management of the connected apparatuses.

In general, if a storage apparatus is larger in scale than a certain level, the storage apparatus includes a plurality of volumes. Each of the volumes may be accessed by a certain specific host or may be shared by a plurality of hosts belonging to a certain group, or may be commonly accessed by all the hosts in the system. That is, such volumes may be managed in various forms. Further, as a volume type, there is provided a block access device that allows an access from the host at a unit of 512 bytes. Or, in a storage apparatus called an NAS (Network Attached Storage), each device is allowed to be presented to the host as one file system.

Recently, the protocol called SCSI over IP that flows the SCSI protocol onto the LAN is made more and more standardized. The storage apparatus that has been located only on the Fibre channel may be thus connected onto the Ethernet that has interconnected the hosts with each other. It means that the storage management is likely to be more and more complicated. The conventional management software that manages only the LAN or SAN cannot cope with the complicated management of the storages.

SUMMARY OF THE INVENTION

It is an object of the present invention to provide a method of managing a plurality of storages and volumes in a more fine and more user-understandable manner in a network environment where the storages and volumes are interconnected through different physical communication lines such as the Ethernet and Fibre Channel.

In carrying out the object, the system according to the invention will be described below. According to an aspect of the invention, a computer system is composed of a plurality of hosts, a plurality of storage subsystems, and a managing subsystem for managing the plurality of hosts and storage subsystems. The storage subsystems have their interfaces, respectively. For example, one storage subsystem has an Ethernet interface, one storage subsystem has a Fibre channel interface, and another storage subsystem has one or more Ethernet interfaces and Fibre channel interfaces.

Further, some storage subsystems include a "block access device" to be accessed according to the block access protocol like iSCSI (Internet SCSI), some storage subsystems include a "file access device" to be accessed according to a file access protocol like an NFS (Network File System), and other storage subsystems include both of the block access device and the file access device. Each of the hosts are interconnected with the storage subsystems through the Ethernet or the Fibre channel. In some connecting form, an Ethernet switch or a Fibre channel switch may be laid between the host and the storage subsystems.

The management host according to the invention includes means (view) for graphically displaying a configuration of a computer system to a user so that the user can select the display method. As the display methods to be selected by the user are mainly a physical view and a logical view. The physical view displays how each host is connected with the storage subsystems through the Ethernet or the Fibre channel. The logical view displays the connecting relation of the devices included in each host and each storage subsystem.

The physical view provides a three options of displaying only the host and the storage subsystems interconnected through the Fibre channel, displaying the host and the storage subsystems interconnected through the Ethernet, or displaying both of them. The logical view provides a three options of displaying only the block access device, displaying only the file access device, or displaying both of them. The management host is served to collect information about the apparatuses and the volumes required for the display from each host, storage subsystem or Fibre channel switch and then to display the view selected on the collected information by the user.

Further, in general, the device inside of the storage subsystem connected through the Fibre channel is a block access device to be accessed from the host according to the Fibre Channel Protocol for SCSI. If a certain host is served as a file server and uses the device and allows an access to another host in an access protocol such as an NFS, the block access device is equivalent to a file access device. In this case, on the logical view, it is preferable that the block access device is viewed as a file access device to the user. In the present invention, the management host collects the information about the file system of each host and also allows the device apparently viewed as the block access device but actually used as the file access device to be displayed as the file access device on the logical view.

Other objects, features and advantages of the invention will become apparent from the following description of the embodiments of the invention taken in conjunction with the accompanying drawings.

BRIEF DESCRIPTION OF THE DRAWINGS

FIG. 3 is a table showing a content of an FC storage information 60;

FIG. 4 is a table showing a content of an IP storage information;

FIG. 5 is a table showing a content of a unused device information 100;

FIG. 6 is a table showing a content of a host interface management information 80;

FIG. 7 is a table showing a content of a file server management information 90;

FIG. 8 is a table showing a management information of an apparatus connected to a Fibre channel switch 4;

DESCRIPTION OF THE EMBODIMENTS

Figure 1:
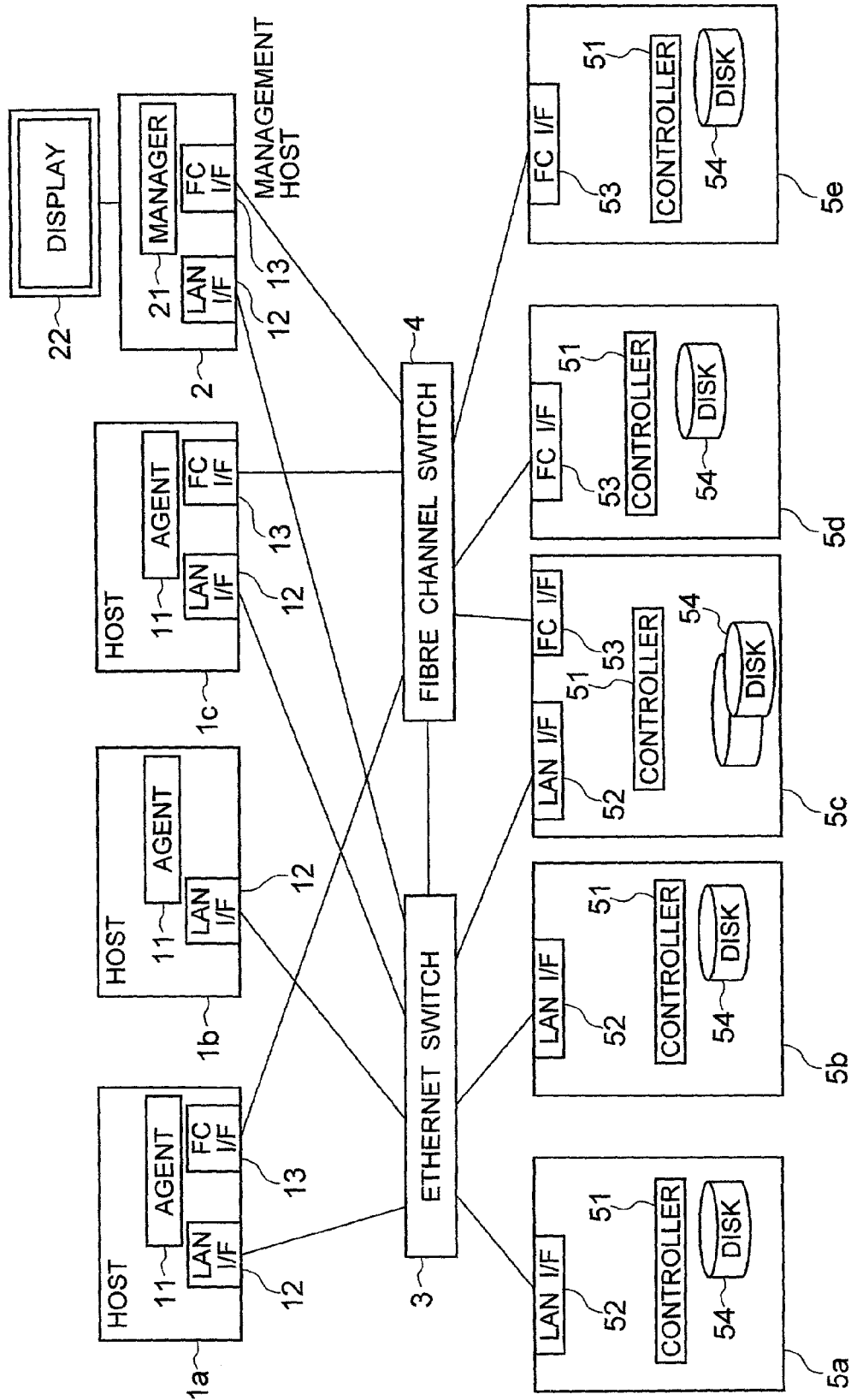
FIG. 1 is a block diagram showing an exemplary configuration of a computer system according to a first embodiment of the present invention.

FIG. 1 is a block diagram showing an exemplary configuration of an embodiment of a computer system to which the present invention applies. The computer system is configured to have a plurality of hosts, that is, a host 1a, a host 1b and a host 1c (collectively called hosts 1), a management host computer 2, an Ethernet switch 3, a Fibre channel switch 4, and a plurality of storage subsystems 5a to 5e.

The host 1 includes an Ethernet interface 12 (abbreviated as LAN I/F) and a Fibre channel interface 13 (abbreviated as FC I/F). The host 1 makes access to a plurality of storage subsystems through the Ethernet switch 3 and the Fibre channel switch 4. Further, the host 1 includes the software called an agent 11, which is served to communicate with the management host 2.

The management host 2 includes a manager 21 through which the information is transferred with each agent 11. Like the host 1, the management host includes a LAN I/F 12 and an FC I/F 13 through which it may access a plurality of storage subsystems. However, the main roles of the LAN I/F 12 and the FC I/F 13 are mainly served as a communication port through which the manager 21 communicates with each agent 11. Further, the management host 2 includes a display 22 on which the management information of the computer system is graphically displayed to the user. Though not illustrated, the management host 2 also includes input devices such as a keyboard and a mouse for interactively changing the display information through a graphical user interface (GUI).

Each of the storage subsystems 5a, 5b, 5c, 5d, 5e (collectively called a storage 5) includes a controller 51 and a disk 54. Of the storage 5, the storage subsystems 5a and 5b include an Ethernet interface 52, respectively, the storage subsystems 5d and 5e include a Fibre channel interface 53, respectively, and the storage subsystem 5c includes both the Ethernet interface 52 and the Fibre channel interface 53.

Moreover, in this embodiment, each of the storage subsystems 5a, 5b, 5d, 5e includes a disk 54 and the storage subsystem 5c includes two disks 54. In actual, the storage subsystems may include two or more disks, respectively. The disk 54 may be a single magnetic disk drive or an apparent logical disk composed by combining a plurality of magnetic disks like a disk array. The controller 51 operates to accept an input/output process from the host 1 or perform the process or the management of the apparent logical disk if it is composed by combining a plurality of physical drives like the disk array.

In this embodiment, the disk 54 to be accessed through the Fibre channel is a device that follows the Fibre Channel Protocol for SCSI (SCSI protocol on the Fibre channel), the disk 54 to be accessed through the Ethernet is a device that follows the iSCSI (Internet SCSI) protocol or a device that follows a file access protocol such as NFS (Network File System) or CIFS (Common Internet File System). The Fibre Channel Protocol for SCSI or the iSCSI protocol is executed to access data at a fixed-length block (generally, 512 bytes) unit. In this embodiment, the disk to be accessed according to the Fibre Channel Protocol for SCSI or iSCSI protocol is called a block access device. Further, the NFS/CIFS protocol is executed to manage data at a file unit and has a byte as a minimum access unit. In this embodiment, the disk to be accessed according to the NFS/CIFS protocol is called a block access device or a NAS device.

Figure 2:
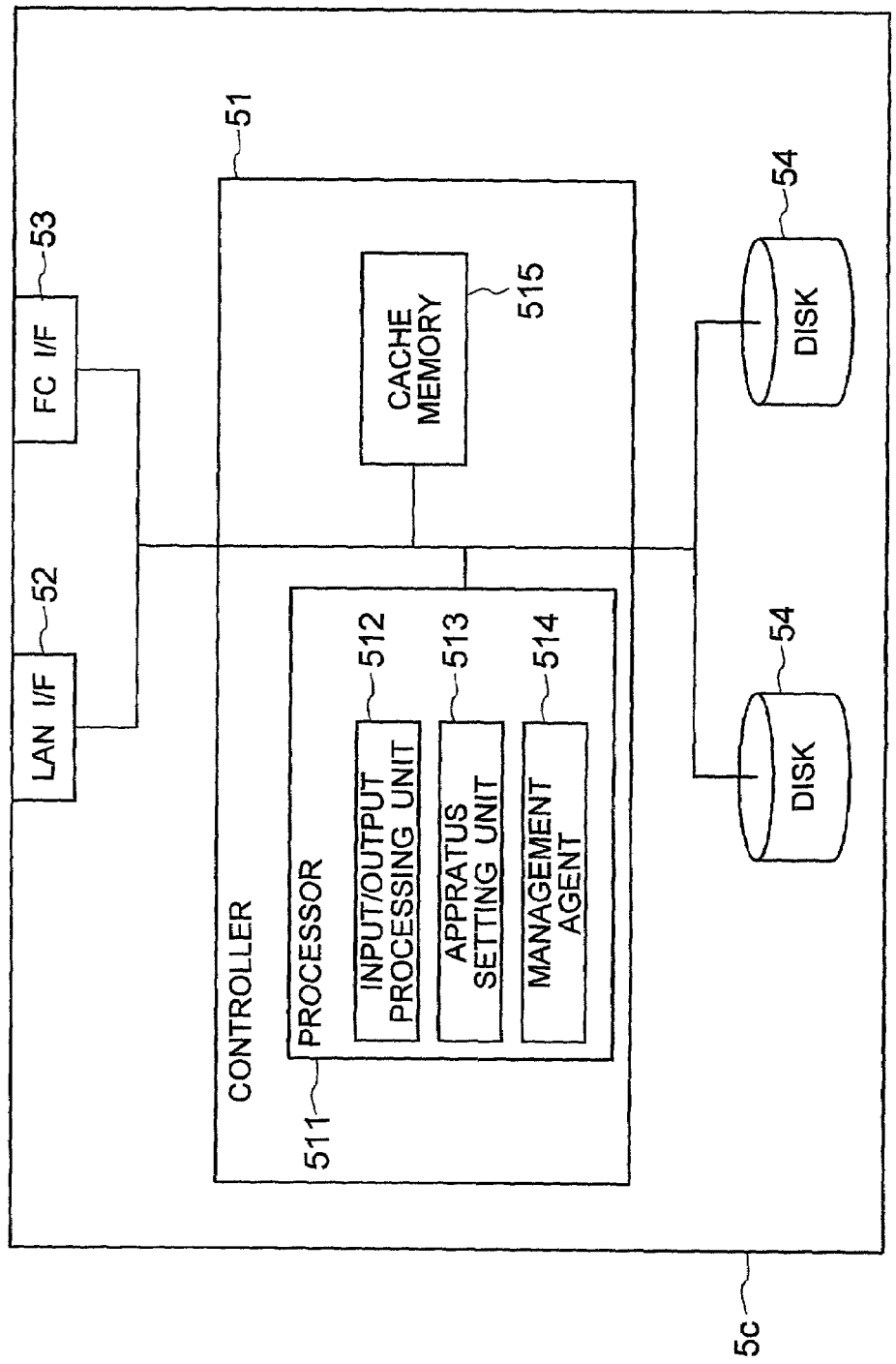
FIG. 2 is a block diagram showing a configuration of a storage subsystem 5c of the computer system according to the first embodiment of the present invention.

In succession, the description will be oriented to the configuration of the controller 51 included in the storage 5. In FIG. 2, the components of the controller 51 are illustrated with the storage subsystem 5c as an example. The controller 51 is mainly composed of a processor 511 and a cache memory 515. The processor 511 includes an input/output processing unit 512 for performing an input/output process like an access to the cache memory 515 or the disk 54 in response to an input/output request from the host 1, an apparatus setting unit 513 for performing various settings of the storage subsystem 5c such as setting of an IP address of the LAN I/F 52, and a management agent 514 for communicating with the manager 21 of the management host 2. The cache memory 515 is used for temporarily storing frequently-used data, for making the input/output access from the host faster. In FIG. 2, the configuration of the controller 51 will be described with the storage subsystem 5c as an example. The other storage subsystems 5a, 5b, 5d, 5e include the input/output processing unit 512, the apparatus setting unit 513, and the management agent 514 as the components, respectively.

Then, the description will be oriented to the information about the apparatus to be collected and managed from each agent 11 of the host 1 and the management agent 514 of the storage 5 by the manager 21 of the management host 2 shown in FIG. 1. The management host 2 collects information from the host 1 and the storage 5 or the Ethernet switch 3 or the Fibre channel switch 4 and is served to display a connecting relation (topology) between the host 1 and the storage 5 based on the collected information.

FIGS. 3 and 4 show an apparatus information management table of the storage 5 managed by the management host 2, in which FIG. 3 shows the information of the disk inside of the apparatus connected with the Fibre channel (referred to as FC storage information 60) and FIG. 4 shows the information of the disk inside of the apparatus connected with the Ethernet (referred to as IP storage information 70). The table shown in FIG. 5 manages the information of the disk not to be used by the host 1 (referred to as unused device information 100). The apparatus ID 61 represents a unique identifier to the storage included in the network.

In the tables shown in FIGS. 3, 4 and 5, the numeric values of 1, 2, 3, . . . are assigned as identifiers. In actual, however, the identifiers are not necessarily the numeric values. If a plurality of devices (disks) are located inside of the apparatus, the management host 2 assigns a unique identifier to each device for managing the devices. This identifier may be the identifier defined inside of the storage subsystem 5. The apparatus ID 61 and the device ID 62 are common to the tables shown in FIGS. 3, 4 and 5. For example, though the information entry of the apparatus ID 61 of "3" exists in the tables shown in FIGS. 3 and 4, it means that the apparatus whose ID 61 is "3" (the storage subsystem 5c in this embodiment) has both the device connected with the Fibre channel and the device connected with the Ethernet.

A WWN 63 is a unique number in the Fibre channel interface. If a storage includes the Fibre channel interface, and if the device in the storage is to be accessed by the Fibre channel interface, the WWN is allocated to each device for managing the devices. A LUN 64 means a logical unit number allocated to each device and a size 65 means a size of the device. A connection permission WWN 66 is used when each device is set to accept only the access from the host having a specific WWN. If the connection permission WWN 66 is specified, it means that only the host having the specified WWN in the hosts 1 can access the concerned device. If a NULL value is specified, it means that the device with the NULL is permitted to be accessed by all hosts.

In FIG. 4, a MAC address 73 and an IP address 74 are proper numbers to the Ethernet interface. If a storage apparatus includes an Ethernet interface and the devices inside of the apparatuses are to be accessed through the Ethernet interface, the host 1 makes access to the target device with these MAC address and IP address. If the storage includes a plurality of Ethernet interfaces and a target device is to be accessed through these interfaces, two or more addresses are entered into the MAC address 73 and the IP address 74.

The entry "Export Directory" 75 is used when the device is accessed as a network file system such as NFS and CIFS. The concerned device is viewed as the direction with the name specified by the Export Directory 75 from a viewpoint of a client. The entry "LUN" 76 is used for the iSCSI device. It is made to be a NULL value for the device to be accessed by NFS/CIFS. The entry "Size" 77 represents the size of a device like the entry "Size" 65 shown in FIG. 3. The entry "Connection Permitted Host" 78 is used in limiting the host (s) to be accessed from each device.

FIG. 5 shows the unused device information 100 that allows the host 1 to manage the information of a virgin disk. In a case that the storage apparatus is not a single physical drive but a combination of magnetic disks as plural logical disks like the disk array apparatus, it is possible to freely set the concerned logical disk as any type of device to be viewed to the host 1. It is also possible to set the logical disk so that it is hidden from the host 1. In this case, since it does not belong to the tables shown in FIGS. 3 and 4, it is managed as the virgin disk. The apparatus ID 61 and the device ID 102 are the same identifiers as the device ID 62. The size 103 represents the size of the virgin disk.

In succession, the description will be oriented to the management information of the host group inside of the network managed by the management host 2. FIG. 6 shows the information about the Ethernet interface 12 and the Fibre channel interface 13 possessed by the host 1, which information is called the host interface management information 80. The host interface management information 80 concerns with the network information including a host name 81, a WWN 82 of the Fibre channel interface 13 possessed by the host 1, a MAC address 83 and an IP address 84 of the Ethernet interface 12. In a case that two or more Fibre channel interfaces 13 or Ethernet interfaces 12 are provided, two or more WWNs or MAC addresses are registered accordingly. In a case those interfaces are not provided, the corresponding entries are given NULL.

FIG. 7 shows a table used if a host operated as the NFS server or the CIFS server is provided in the host group inside the network managed by the management host 2. This table indicates the file server management information 90. An entry "host name" 81 is given a host name where the NFS or CIFS server (daemon program of the network file system) is operated. The entries "using apparatus" 92 and "device ID" 93 are given the apparatus ID and the device ID where the file system permitted by the NFS or CIFS server to be accessed by another host is provided. The entry "Export Directory" 94 is a shared directory name, that is, the mount point when the NFS or the CIFS server make the file system open to the outside.

The table shown in FIG. 8 indicates the management information of the apparatus connected with the Fibre channel switch 4. The entry "zone" 111 represents the logical units (zone) of two or more divided switches if the Fibre channel switch 4 is logically divided into two or more parts by zoning. Though each zone is given a numeric value of 1 or 2, any identifier except a numeric value may be used if it is unique. The entry "WWN" 102 indicates the WWN of the host or the storage apparatus connected to each zone of the Fibre channel switch 4. In this embodiment, since only one Fibre channel switch 4 is provided, just one corresponding table is given. If two or more Fibre channel switches 4 are provided, the corresponding number of tables are given.

Figure 9:
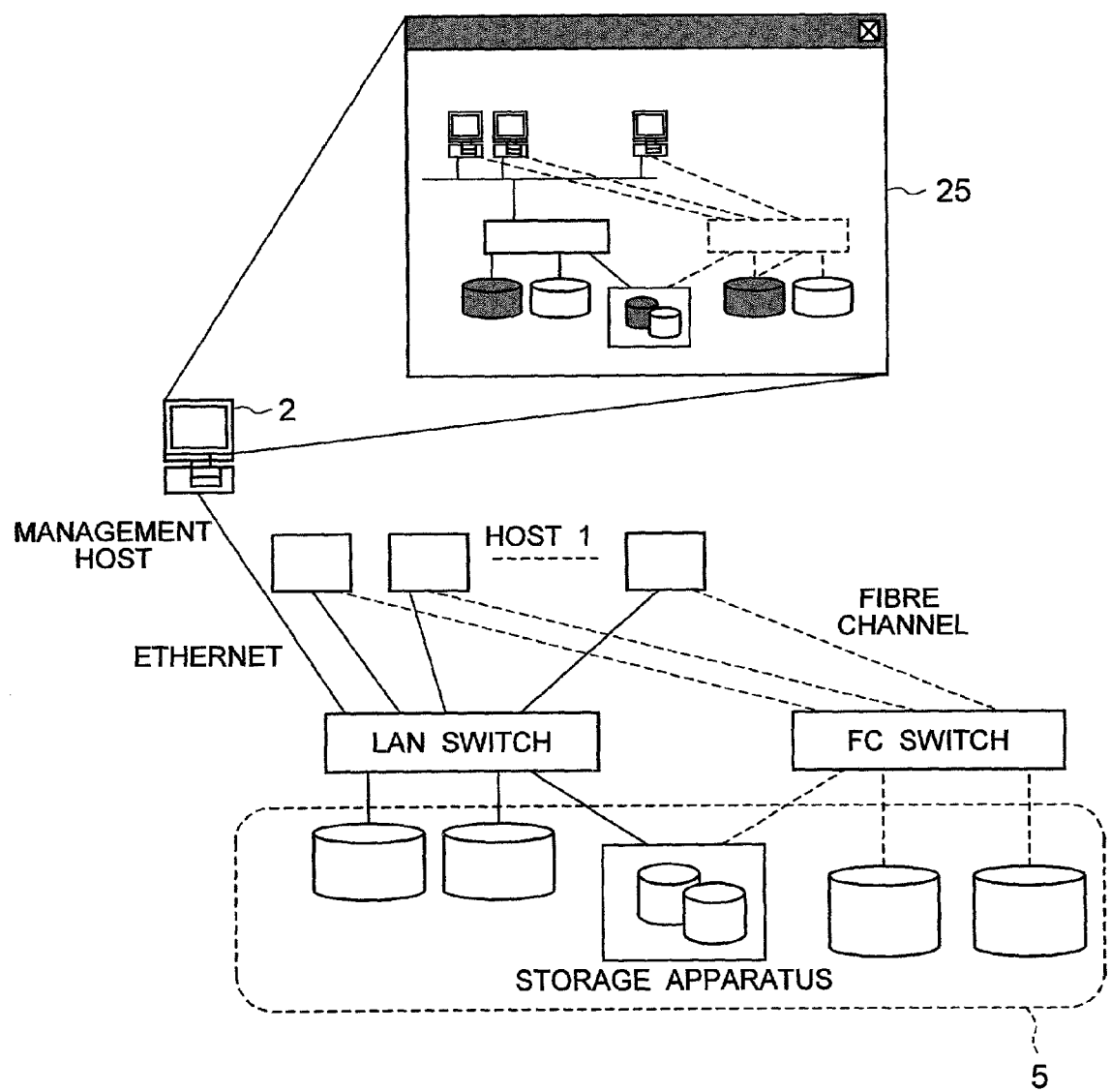
FIG. 9 is a diagram showing an example of a screen displaying method of a management host 2.

In succession, the description will be oriented to how the management host 2 provides the collected information shown in FIGS. 3 to 8 to the user with reference to FIG. 9 or later. The management host 2 operates to graphically display the management information of the computer system on a display 22. FIG. 9 shows an example of the screen display 25 of the computer system according to the embodiment, which is shown on the display 22 by the management host 2. On the screen, it is possible to promptly grasp how each host 1 is connected with the storage apparatus 5 or which of the apparatuses malfunctions. Further, by selecting the host 1 or the storage apparatus 5 with a mouse or the like, the apparatus information (including the IP address of the host 1 or the capacity of the device inside the storage apparatus) may be displayed.

The display form of the screen are roughly divided into two forms, that is, a physical view display function that displays a physical connecting relation of the apparatuses and a logical view display function that displays the connecting relation between each device (disk) of the storage apparatus 5 and the host 1. The physical view is mainly useful of means of grasping the state of each apparatus (normal operation or malfunction). The logical view is useful of grasping the capacity and the type of the device that each storage apparatus 5 possesses.

Figure 10:
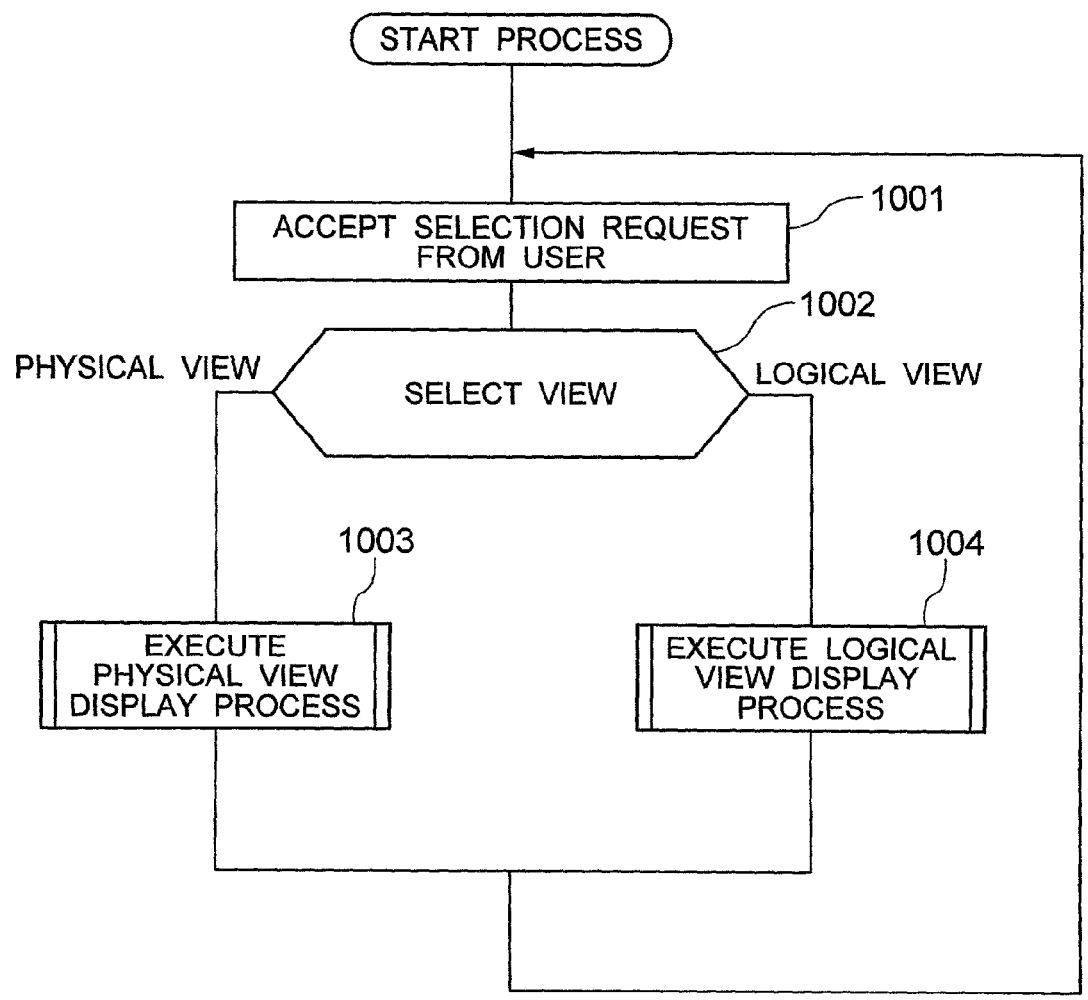
FIG. 10 is a flowchart showing a process of selecting and displaying a view on which a manager 21 accepts a request of a user.

FIG. 10 is a flowchart showing how the manager 21 accepts a request of the user, selects the view, and displays it. The physical view or the logical view can be freely selected by the user's instruction to the management host. At first, the process is executed to accept a request of selecting which of the physical view and the logical view (step 1001). The selecting request given by the user is realized by accomplishing the selection of a pull-down menu on the GUI screen. Then, the manager 21 recognizes the user's selection (step 1002). If the physical view is selected, the physical view display process is executed (step 1003), while the logical view is selected, the logical view display process is executed (step 1004). Next, the process of returning to the step 1001 is repeated for waiting for the user's request of selecting the view. More detailed processes of the steps 1003 and 1004 will be described later.

The physical view has the following three ways of display.
(1) Only the apparatuses connected by the Fibre channel are displayed.
(2) Only the apparatuses connected by the Ethernet are displayed.
(3) The apparatuses of (1) and (2) are displayed at a time.
In the case of (3), all the apparatuses inside the system are displayed.

Figure 11:
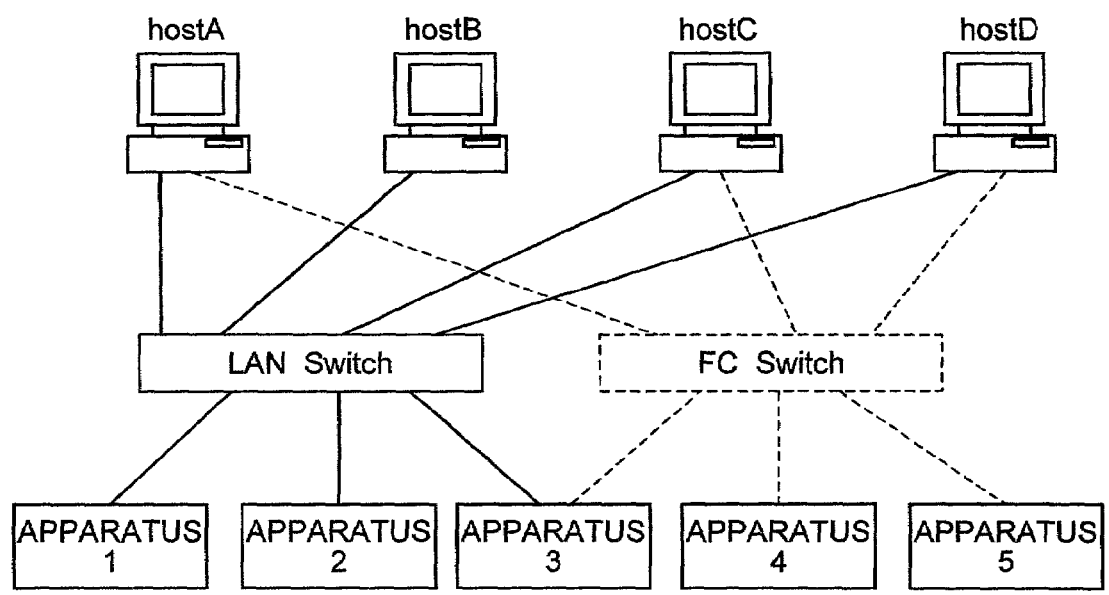
FIG. 11 is a diagram showing a display example of a physical view for displaying a management host 2 in a computer system according to an embodiment of the present invention.

FIG. 11 shows an example of the screen of the physical view displayed by the management host 2 according to the way of display (3) in the system shown in FIG. 1. In the display example of this embodiment, the hosts 1a, 1b, 1c, 2 have their host names host A, host B, host C, host D, which are used on the display example. The storage subsystems 5a, 5b, 5c, 5d, 5e are displayed as the apparatuses 1, 2, 3, 4, 5 on the display example. In order to clearly separate the apparatuses connected by the Fibre channel from the apparatuses connected by the Ethernet, the connection by the Ethernet is depicted by a real line, while the connection by the Fibre channel is depicted by a dotted line. In place, these connections may be separated in respective colors.

In a case that the number of the apparatuses configured on the system is relatively small as shown in FIG. 1, the way of display (3) is practical, while if the number of the configured apparatuses is greater, it is difficult to refer to all the apparatuses on one screen. In particular, difficulty is focused on that the communication lines of connecting the host 1 with the storage apparatus 5 are made complicated on the display screen. In order to overcome this difficulty, the present invention has a function of displaying only the apparatuses connected with the Fibre channel and the Ethernet like the ways of display (1) and (2).

Figure 12:
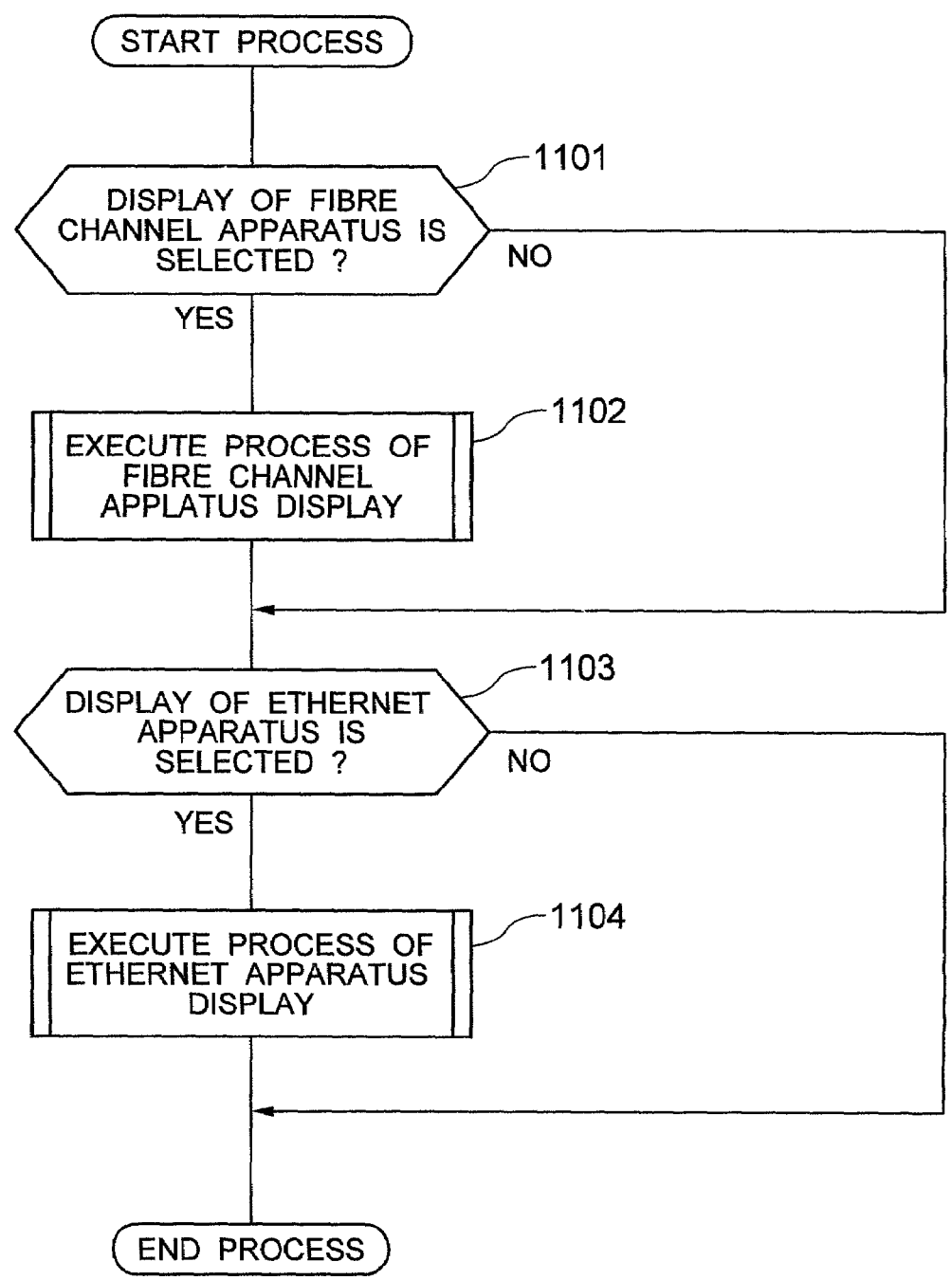
FIG. 12 is a flowchart showing a process of how the manager 21 displays the physical view.

The flow of the physical view display process will be described with reference to FIG. 12. The process is executed to determine if the user requests to display the Fibre channel connected apparatuses (step 1101). If yes, in step 1102, the process is executed to display the Fibre channel connected apparatuses. If no, the process goes to a step 1103, in which it is determined if the user requests to display the Ethernet connected apparatuses. If yes, the process is executed to display the Ethernet connected apparatuses (step 1104).

Figure 13:
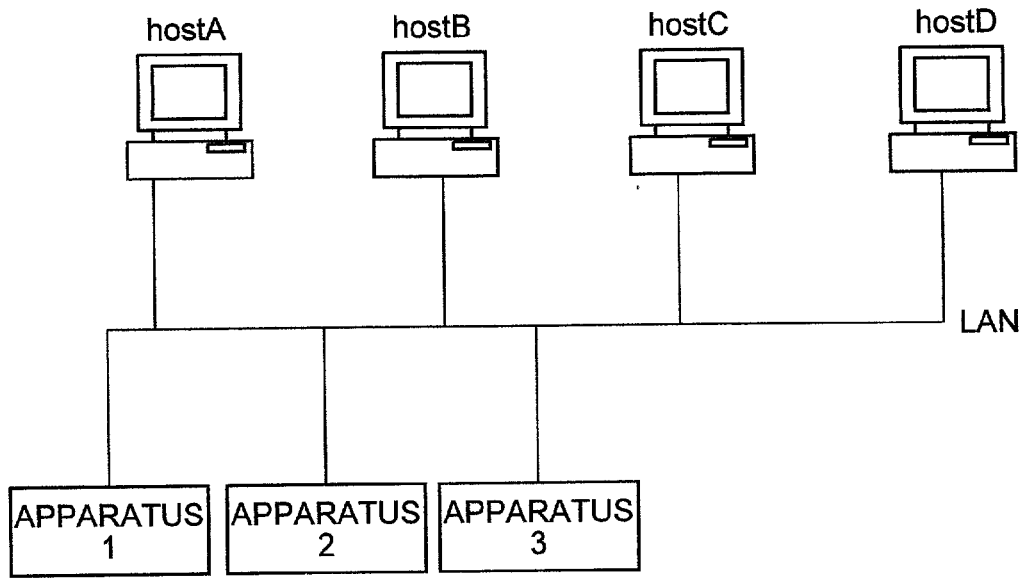
FIG. 13 is a diagram showing a display example of the physical view that the management host 2 displays in a computer system according to an embodiment of the present invention.
Figure 14:
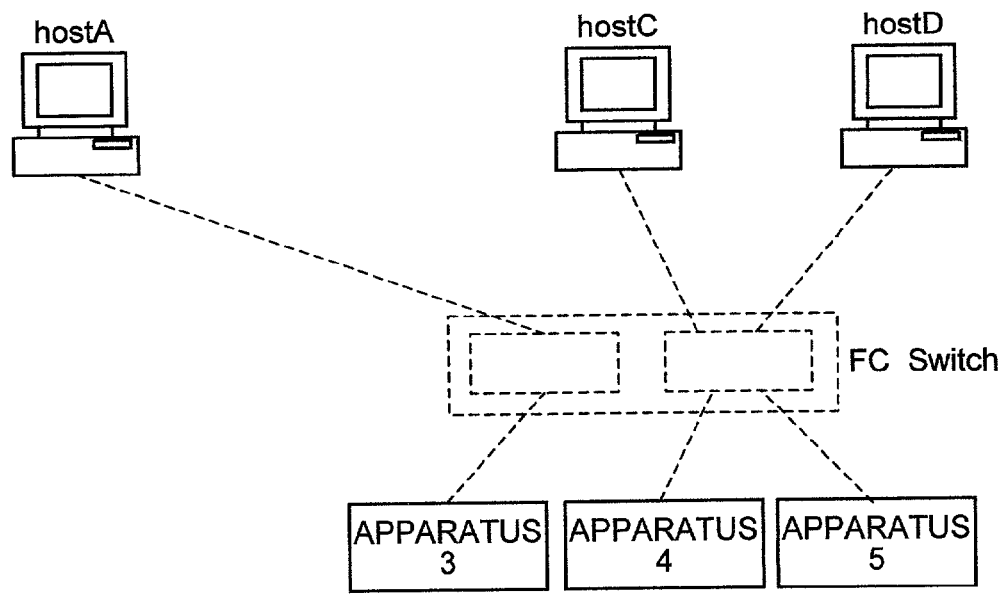
FIG. 14 is a diagram showing a display example of the physical view that the management host 2 displays in a computer system according to an embodiment of the present invention.

FIG. 13 shows the screen on which only the apparatuses connected by the Ethernet are displayed on the system configuration shown in FIG. 1. FIG. 14 shows the screen on which only the apparatuses connected by the Fibre channel are displayed on the system configuration shown in FIG. 1. If a zoning is set so that one switch is logically divided into two or more switches in the Fibre channel environment, as shown in FIG. 14, the separated connection is displayed. Since it is shown in the separated form, the number of the apparatuses displayed on the screen is made smaller. Hence, the connection shown in the separated form is effective in the case the number of the apparatuses to be managed is larger.

Figure 15:
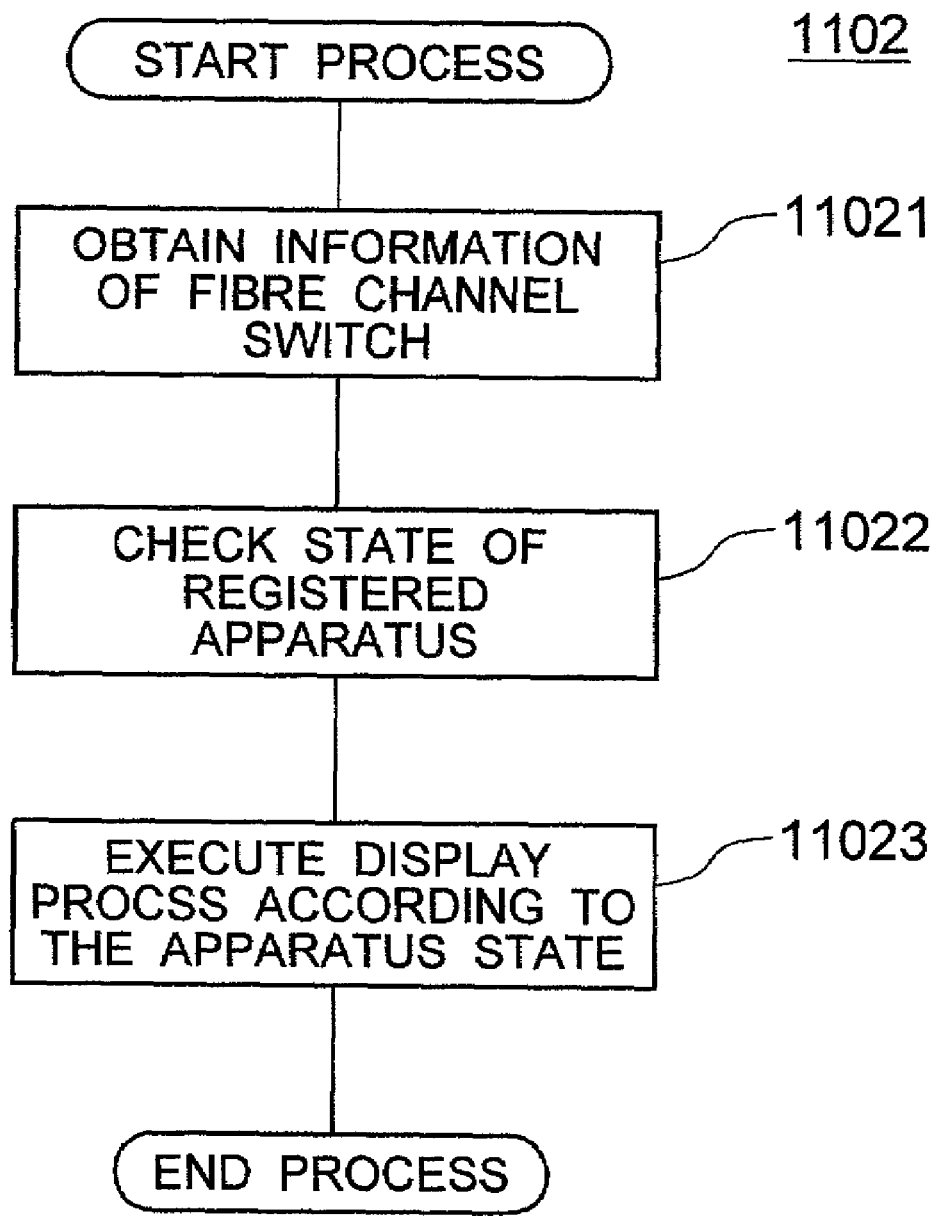
FIG. 15 is a flowchart showing a process of how the management manger 21 displays a Fibre channel apparatus.

FIG. 15 shows the flow of the process of displaying the apparatuses connected by the Fibre channel in step 1102. At first, the process is executed to obtain the management information of the apparatus connected with the Fibre channel switch 4 as shown in FIG. 8 (which management information is referred to as FC apparatus management information) (step 11021). This information may be periodically obtained from the Fibre channel switch 4 by the manager 21. In this case, the process of the step 11021 may be removed.

In succession, the process is executed to check the states of the host 1 and the storage apparatus 5 having the WWN in the FC apparatus management information, selected from the informations of the storage apparatus 5 and the host 1 shown in FIGS. 3 and 6 (step 11022). This process is executed to check the state of the apparatus as the manager 21 is communicating with the agent 11 or the management agent 514. In step 11023, the process is executed to provide the display according to the state of each apparatus from the informations obtained in steps 11021 and 11022. Concretely, if the zoning is set, as shown in FIG. 14, the Fibre channel switch 4 is divided into two or more when it is displayed. Or, if a certain apparatus malfunctions, it is displayed in red.

Figure 16:
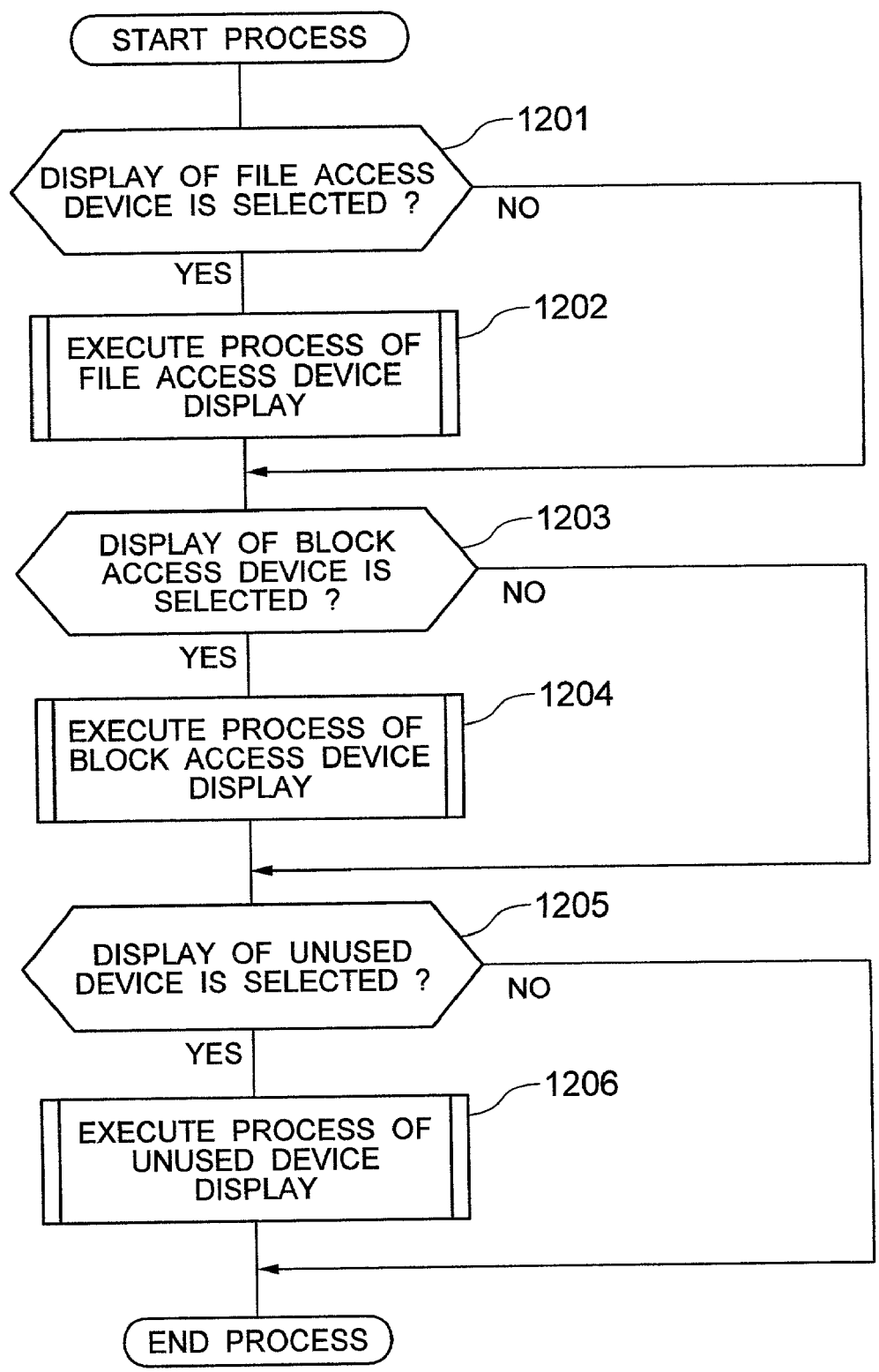
FIG. 16 is a flowchart showing a process of how the manager 21 displays the logical view.

The display of the logical view will be described with reference to FIG. 16 or later. The logical view shows the connecting relation between each disk 54 of the storage apparatus 5 and the host 1. As stated above, the disk 54 according to this embodiment is roughly divided into two types, that is, the block access device and the file access device. In case of large storage system, a plurality of magnetic disks may be divided into several groups, some of which are defined as the block access device and the other of which are defined as the file access device. That is, the type of the device may be dynamically changed. Further, any unused device that does not belong to both of the types may be provided in the system.

Hence, the logical view provides the following four ways of display.

(1) Only the block access device or file access device is displayed (2) All the devices are displayed.

(3) Only the unused devices are displayed.

(4) The connecting relation between the host computer and the disk is displayed when an access limitation is placed on the host computer.

In general, the block access device is used when accessing at a fast speed the data dedicated for a specific system and software, such as a database. The file access device is used when a plurality of host computers share a file. Which of the types is to be selected is irrespective of the interface like the Fibre channel or the Ethernet. It is selected by the user in consideration of the data to be stored and the purpose of use. Hence, independently of the interface through which the storage apparatus is connected, it is preferable that the logical view enables to separate the storage apparatuses into the block access device and the file access device when they are displayed. However, the block access device may be the Fibre channel connected device through the use of the Fibre Channel Protocol for SCSI or the Ethernet connected device through the use of the iSCSI to be transferred on the Ethernet. Hence, the devices according to the iSCSI protocol are separated from those according to the Fibre Channel Protocol for SCSI when the connecting relation among the devices is displayed.

The flow of the process of displaying the logical view will be described with reference to FIG. 16. At first, it is determined if the user requests to display the file access device (step 1201). If yes, the process is executed to display the file access device in step 1202, while if no, the process goes to a step 1203. In step 1203, it is determined if the user requests to display the block access device. If yes, the process is executed to display the block access device (step 1204). In step 1205, it is determined if the user requests to display the unused device. If yes, the process of displaying the unused device is executed in step 1206.

Figure 17:
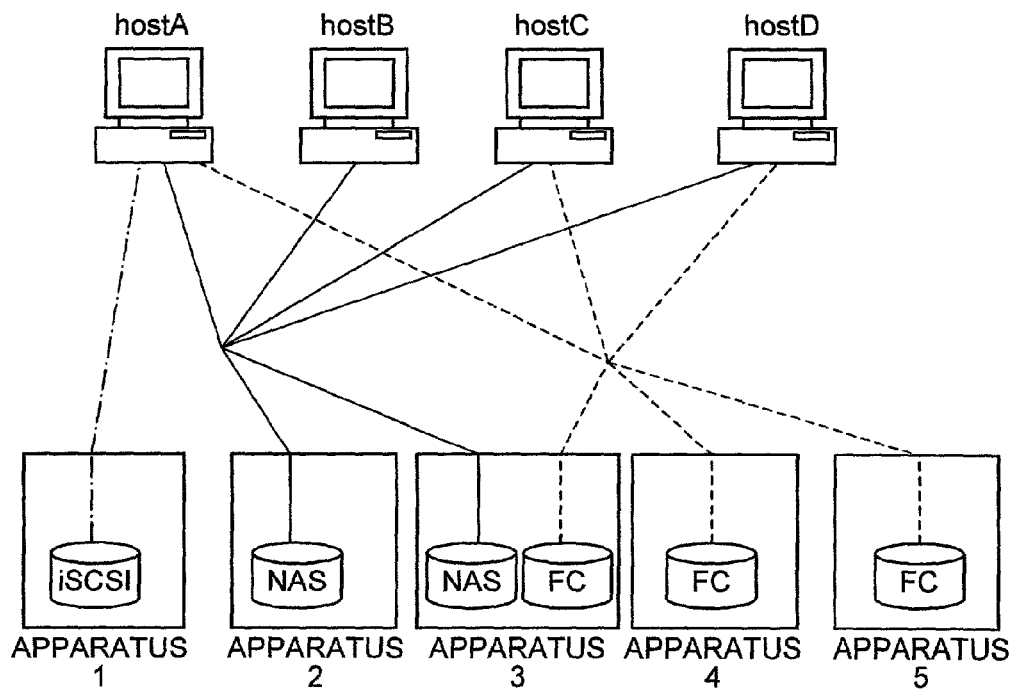
FIG. 17 is a diagram showing a display example of the logical view that the management host 2 displays in a computer system according to an embodiment of the present invention.

FIG. 17 shows the screen where the logical view is displayed according to the way of display (2) by the management host 2 in the system configured as shown in FIG. 1, that is, all the devices displayed on the screen. However, no unused device is provided in this example. In this example, the block access devices are mingled with the devices according to iSCSI protocol and the devices according to the Fibre Channel Protocol for SCSI. On the screen, hence, the device according to the iSCSI protocol is connected with the host 1 in alternate long and short dash lines, the devices according to the Fibre Channel Protocol for SCSI are connected with the host 1 in dotted lines, and the file access devices are connected with the host 1 in real lines. Another way of display may be used like coloring.

Figure 18:
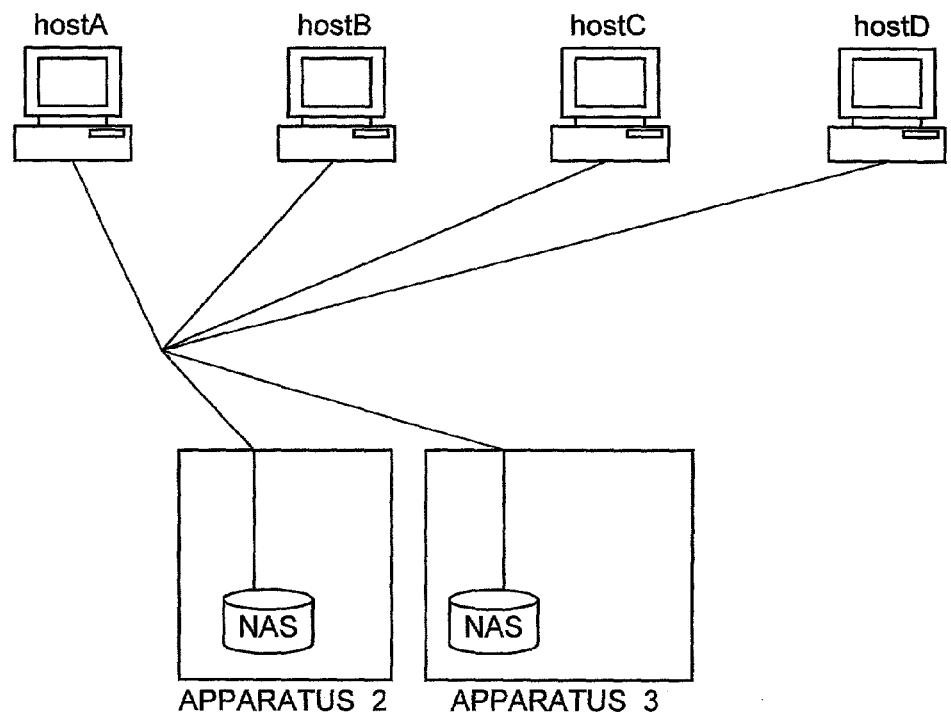
FIG. 18 is a diagram showing a display example of the logical view that the management host 2 displays in a computer system according to an embodiment of the present invention.

FIG. 18 shows an example of a screen where only the file access devices are displayed according to the way of display (1) when the devices whose apparatus ID 61 are "2" and "3" are the file access devices as shown in the management table of FIG. 4. In order to display only the file access device or the block access device, the management host 2 operates to refer to the management table of FIG. 4, extract only the file access device or the block access device, and display it on the screen.

Figure 19:
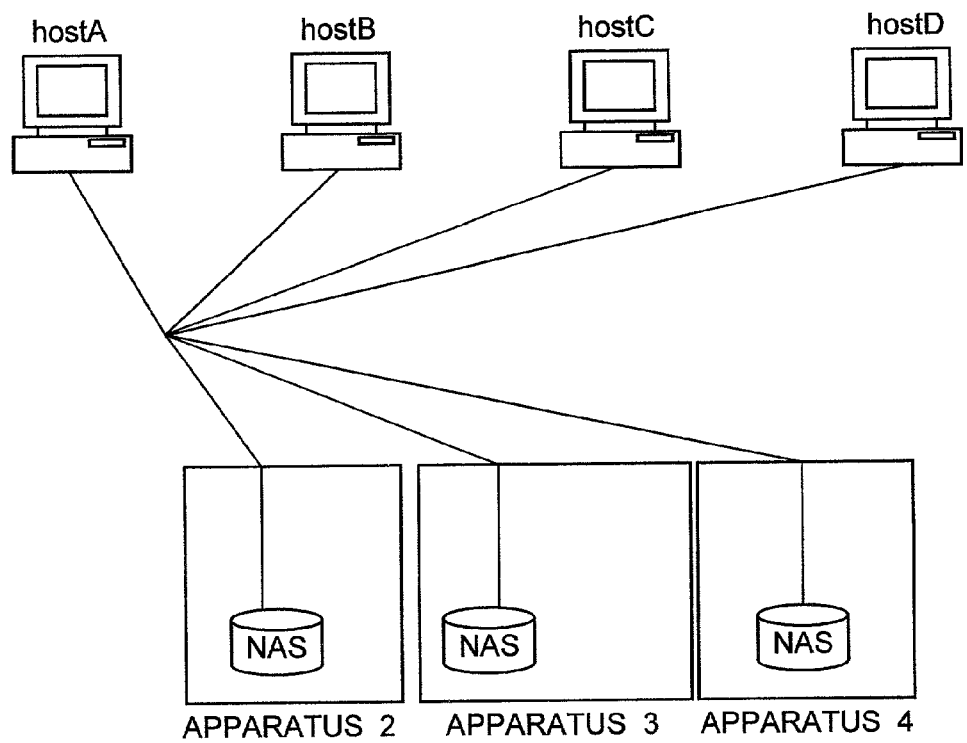
FIG. 19 is a diagram showing a display example of the logical view that the management host 2 displays in a computer system according to an embodiment of the present invention.

As shown in FIG. 7, another form may be provided where a certain host (in which case it is the host C, that is, the host 1c on the configuration shown in FIG. 1) is served as a server of the NFS/CIFS to provide another host 1 with the file system device. In this example, the host 1c provides as the device of NFS/CIFS the disk whose apparatus ID is "4" (that is, the storage subsystem 5d in FIG. 1) and the device ID is "0". In this case, hence, the management host 2 operates to display the storage subsystem 5d as the file access device as shown in FIG. 19. By this operation, the number of erroneous operations is reduced. The erroneous operation is, for example, that the block device that has been used as the file access device may be erroneously selected.

In this embodiment, as shown in FIGS. 4 and 7, the host computer that permits connection of each device has been decided. The management host 2 enables to display the connecting relation between the devices and the host computer in consideration of the access limitation of each device.

Figure 20:
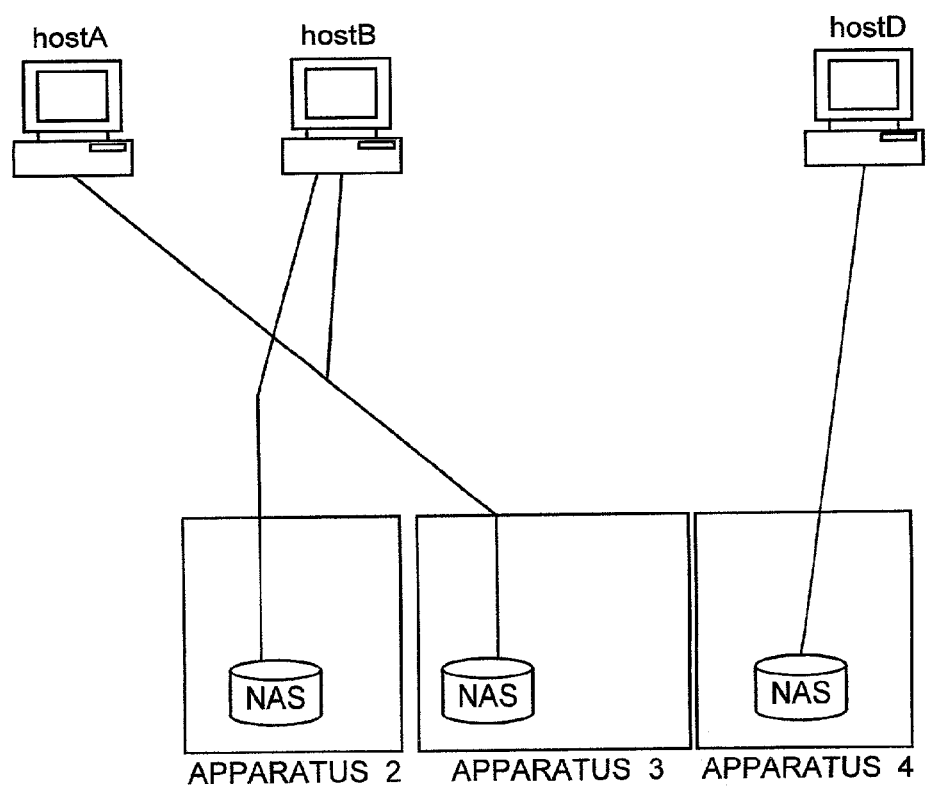
FIG. 20 is a diagram showing a display example of the logical view that the management host 2 displays in a computer system according to an embodiment of the present invention.

FIG. 20 shows the screen appearing when only the file access device is displayed in consideration of the connection permitted hosts 78 and 95 shown in FIGS. 4 and 7. On this screen, it is possible to more clearly grasp the connecting relation between the host computer and each device at the current time. In the example of FIG. 19, the connecting relation between the storage subsystem 5d and the hosts 1a, 1c and 1d is viewed to be formed. As is understood from FIG. 20, in actual, it is obvious that the host 1c cannot access the storage apparatus (in particular, of the file access device).

Figure 21:
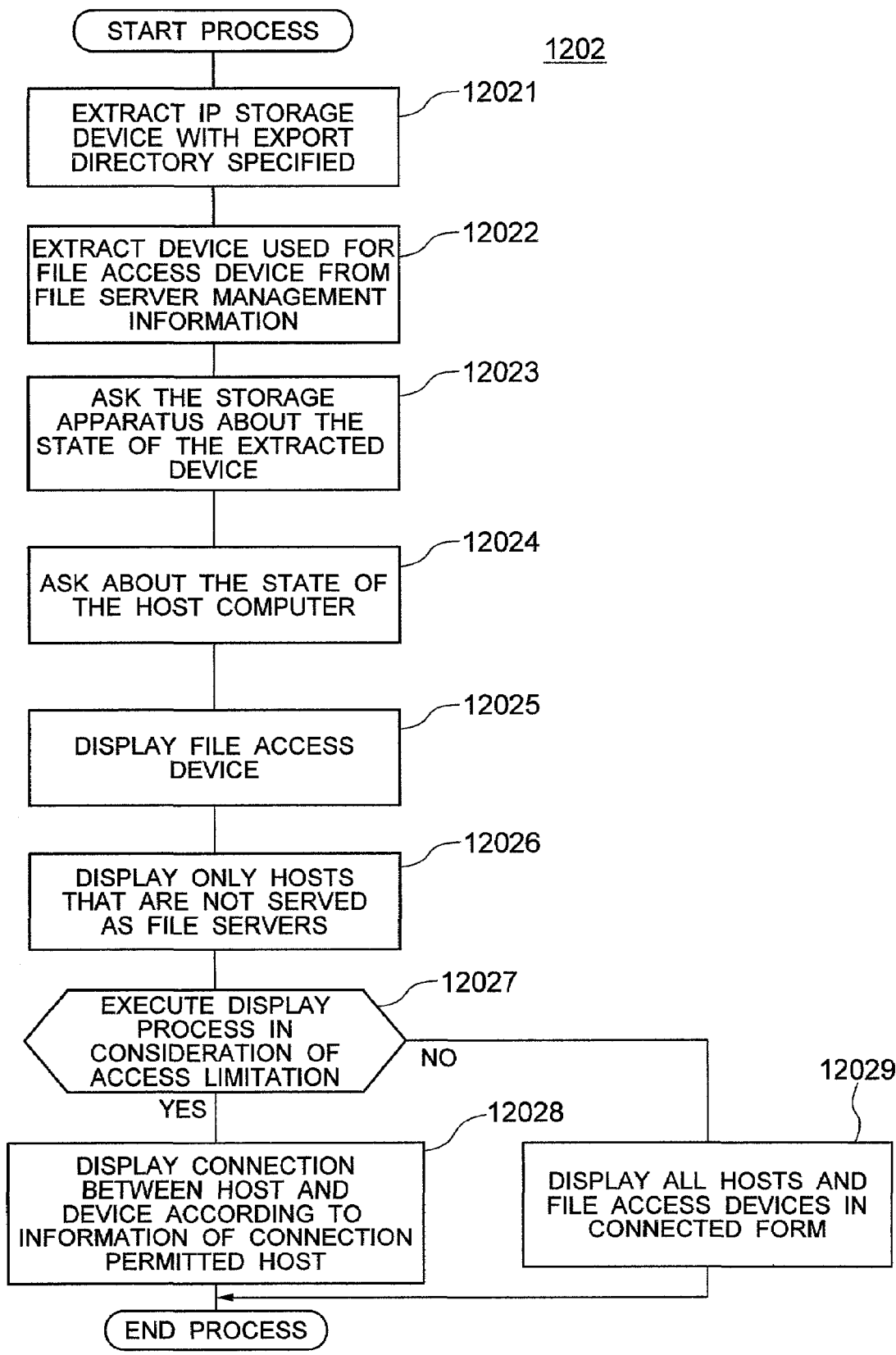
FIG. 21 is a flowchart showing how the manager 21 displays a file access device.

Then, the description will be oriented to the flow of the process of displaying the file access device while the logical view is being displayed (corresponding to the step 1202 of FIG. 16) with reference to FIG. 21. At first, the process is executed to extract the entry where the Export Directory 75 is specified of the IP storage information 70, that is, the file access device (step 12021). Next, the process is executed to pick up the information of the device used for the file access device from the file server management information 90 shown in FIG. 7 (step 12022). This allows even the device connected with the Fibre channel interface as a physical interface to specify the device being actually used as the file access device.

In step 12023, the process is executed to ask the storage apparatus to which each device extracted in the steps 12021 and 12022 belongs of the state of each device. In step 12024, then, the state of each host is inquired. In step 12025, the file access device is displayed, and in step 12026 the hosts (only the hosts that do not operate as the file server) are displayed. In succession, it is determined if the user requests to display the apparatuses in consideration of the access limitation (step 12027). If the request for the display is issued, the process goes to a step 12028, in which each device is interconnected with only the connection permitted hosts by lines by referring to the information of the connection permitted hosts when the state is displayed. If no request is issued, all the hosts are interconnected with all the file access devices by lines on the display (step 12029).

Figure 22:
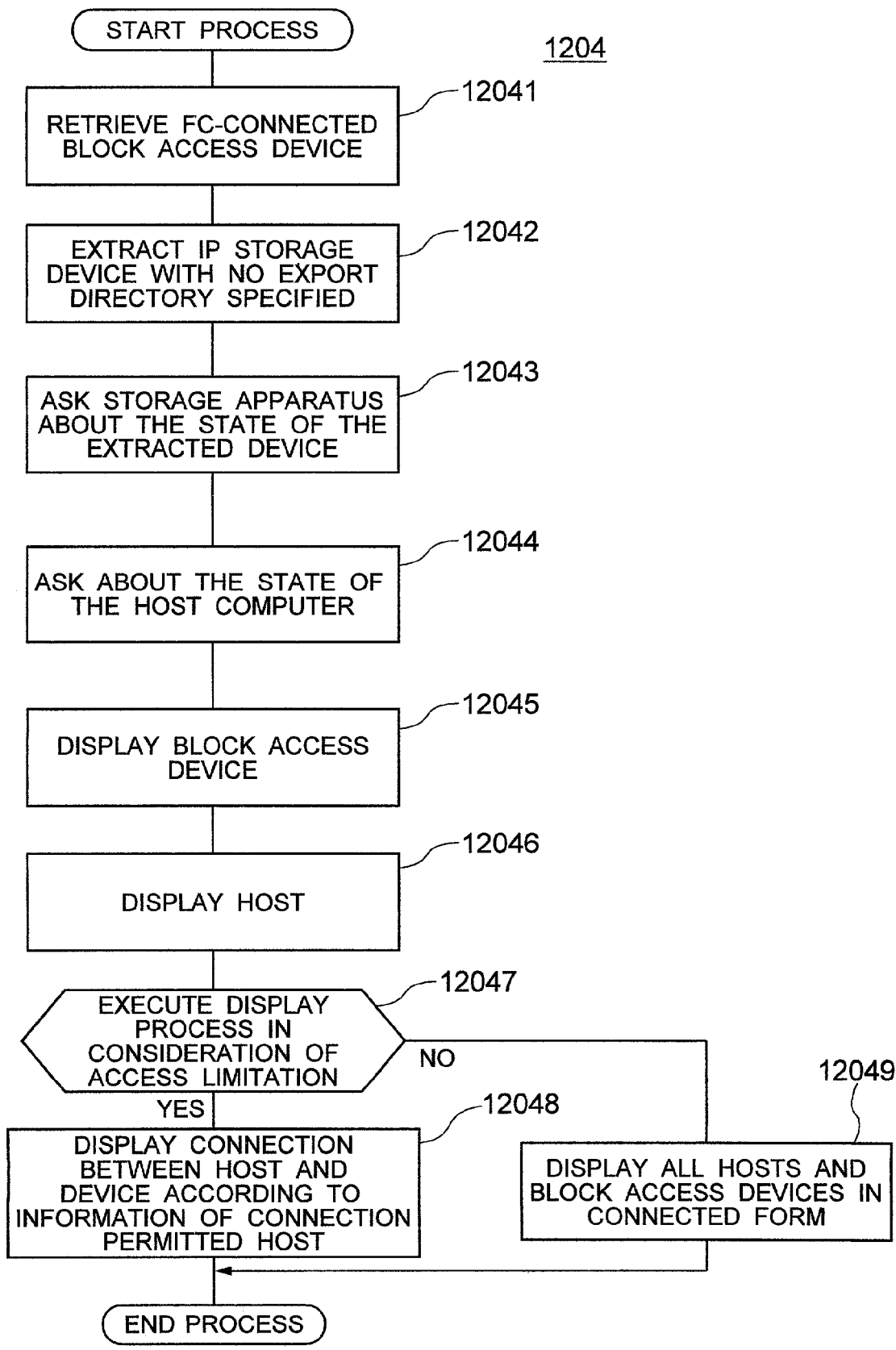
FIG. 22 is a flowchart showing how the manager 21 displays a block access device.

In turn, the description will be oriented to the flow of the process of displaying the block access device while the logical view is being displayed (corresponding to the step 1204 of FIG. 16) with reference to FIG. 22. At first, the process is executed to pick up only the devices connected with the Fibre channel but being used for the file access device by referring to the FC storage information 60 of FIG. 3 and the file server management information 90 of FIG. 7 (step 12041). Next, the process is executed to pick up the information of the devices in which no Export Directory 75 is specified in the IP storage information 70 of FIG. 4 (that is, the iSCSI access device) and that are not used for the file access device in the file server management information 90 of FIG. 7 (step 12042). This allows even the device apparently viewed as the block access device to exclude the device that is actually used for the file access device.

In step 12043, the process is executed to ask the storage apparatus to which each device extracted in the steps 12041 and 12042 belongs of the state of each device. Next, in step 12044, the state of each host is inquired. In step 12045, the block access device is displayed, and in step 12046, the state of the host is displayed.

In succession, it is determined if the user requests the display in consideration of the access limitation from the connection permitted WWN 66 and the connection permitted host 78 included in the FC storage information 60 of FIG. 3 and the IP storage information 70 of FIG. 4 (step 12047). If the request is issued, the process goes to a step 12048, in which each device is connected with only the connection permitted hosts by lines by referring to the information of the connection permitted hosts. If no request is issued, all the hosts are connected with all the block access devices by lines on the screen display (step 12049).

Figure 23:
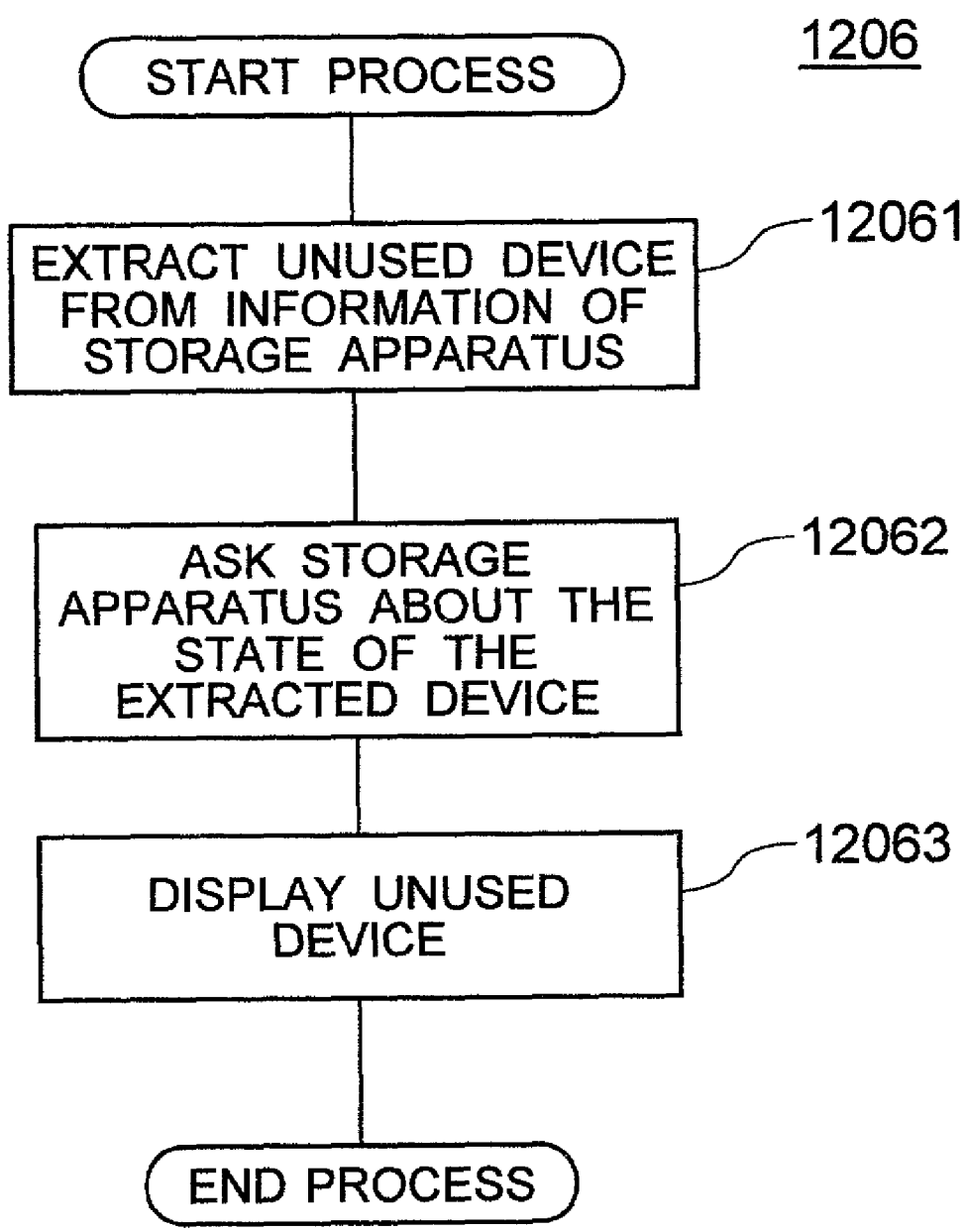
FIG. 23 is a flowchart showing how the manager 21 displays a unused device.

FIG. 23 is a flowchart of the process of displaying a unused device (corresponding to the step 1206 of FIG. 16) with reference to FIG. 23. In step 12061, the unused device information 100 of FIG. 5 is retrieved. In succession, the process is executed to ask the storage apparatus to which the retrieved device belongs of the state of the device (step 12062). Lastly, the unused device is displayed on screen (step 12063), and then the process is terminated. For the unused device, the device is not still connected with the host 1, so that the line connection between the device and the host 1 is not displayed on screen.

According to the foregoing embodiment, the topology display method that is more visually grasped by the user is provided in the environment where the hosts and the storage apparatuses are interconnected through a plurality of interfaces such as the Ethernet and the Fibre channel. Further, the block access device is separated from the file access device when the connecting form is displayed. Hence, the user can more easily manage the block access device connected with the Fibre channel but being used for the file access device, often included in the file server.

The management method of the present invention makes it easier to grasp the management of the apparatus by displaying the apparatus of a specific interface in the environment where a plurality of interfaces are mingled. Further, the disk capacity management according to each way of purpose is made possible by displaying only the information of a specific device selected from several types of devices.

It should be further understood by those skilled in the art that the foregoing description has been made on embodiments of the invention and that various changes and modifications may be made in the invention without departing from the spirit of the invention and the scope of the appended claims.

What is claimed is:

1. A computer system configured of a plurality of computers, a plurality of storage subsystems, and a storage management computer, comprising:

said computers having means for transmitting a plurality of input/output requests and input/output data between said computers and a first portion of said storage subsystems through Ethernet and between said computers and a second portion of said storage subsystems through a Fibre Channel (FC), said first portion of said storage subsystems including at least one Internet SCSI (iSCSI) storage device;

said storage subsystems including at least one of first storage device to be accessed by said computers according to a file access protocol and at least one of second storage device to be accessed by said computers according to a block access protocol, said second storage devices including said iSCSI storage device;

said storage management computer connected with said storage subsystems through said Ethernet and FC and having, a display apparatus, and a physical view display means for displaying physical connecting relation on said display apparatus in one of (a) a first display mode of displaying said computers and said storage subsystems interconnected through said Ethernet and their connecting relation (topology), (b) a second display mode of displaying said computers and said storage subsystems interconnected through said FC and their connecting relation (topology), and (c) a third mode of displaying the physical connecting relation both of said first and second display modes at a time, a logical view display means for displaying logical connecting relation on said display apparatus in one of (d) a fourth display mode for displaying said computers, said first storage devices and their topology, said first storage devices being identified under a first condition that a export directory of each of said storage device is specified as a mount point, and (e) a fifth display mode for displaying said computers, said second storage devices and their topology, said second storage devices being identified under a second condition that said block access protocol is used to access to each of said devices and/or a third condition that said export directory of each of said storage devices is not specified, (f) a sixth mode of displaying the logical connecting relation both of said third and fourth display modes at a time, (g) a seventh display mode for displaying unused storage device, and (h) an eighth display mode for displaying connection between said computers and said first and second storage devices under access limitation, and means for allowing a user to select one of said first to eighth display mode.

2. A computer system as claimed in claim 1, wherein at least one of said second storage devices is a storage device to be accessed by one of said computers according to said file access protocol.

3. In a computer system configured of a plurality of storage subsystems, a plurality of computers for transmitting a plurality of input/output requests and input/output data between said computers and a first portion of said storage subsystems through Ethernet and between said computers and a second portion of said storage subsystems through a Fibre Channel (FC), said first portion of said storage subsystems including at least one Internet SCSI (iSCSI) storage device and a storage management computer being connected with said storage subsystems through said Ethernet and FC and having a display apparatus, a storage management method executed by said storage management computer comprising the steps of:

obtaining first display information used for displaying said computers and said storage subsystems interconnected through said Ethernet and their connecting relation (topology) on said display apparatus;

obtaining second display information used for displaying said computers and said storage subsystems interconnected through said FC and their connecting relation (topology) on said display apparatus; and obtaining third display information used for displaying a topology between a first storage device to be accessed by said computers according to a file access protocol, said, first storage device being included in said storage subsystems, and said computers, wherein said first storage devices being identified under a first condition that an export directory of each said storage device is specified as a mount point;

obtaining fourth display information used for displaying a topology between a second storage device to be accessed by said computers according to a block access protocol, said second storage device being included in said storage subsystems, and said computers, wherein said second storage devices being identified under a second condition that said block access protocol is used to access to each of said devices and or a third condition that said export directory of each said storage device is not specified;

obtaining fifth display information used for displaying unused storage devices, obtaining sixth display information for displaying connection between said computers and said first and second storage devices under access limitation, and displaying at least one of said first to sixth display information on the basis of an indication entered into said storage management computer.

* * * * *